United States Patent [19]

Francis et al.

[11] 4,453,124

[45] Jun. 5, 1984

[54] LINEAR INDUCTIVE TRANSDUCERS

[75] Inventors: John H. Francis, Cirencester; John P. Vernon, Chipping Sodbury; John H. Moore, Kingscote, all of England

[73] Assignee: Lucas Industries plc, Birmingham, England

[21] Appl. No.: 395,675

[22] Filed: Jul. 6, 1982

[30] Foreign Application Priority Data

Jul. 10, 1981 [GB] United Kingdom ................ 8121311

[51] Int. Cl.³ ............................................. H02P 13/10
[52] U.S. Cl. .................................... 323/347; 323/369
[58] Field of Search ............... 323/340, 343, 345, 347, 323/355–356, 369; 336/130, 132, 134, 136

[56] References Cited

U.S. PATENT DOCUMENTS 3,225,289 12/1965 Koppel et al. ...................... 323/347
3,235,790  2/1966 Collins ................................ 323/347
3,441,834  4/1969 Moskowitz et al. ............... 323/347
3,484,678 12/1969 Church .............................. 323/347

Primary Examiner—Peter S. Wong

[57] ABSTRACT

A linear inductive transducer includes a non-magnetic former which has a bore in which is slidable a core formed from magnetic material. The core in use is moved axially within the former by the component whose axial position it is required to sense. The former has three circumferential grooves in which are located coils connected together to form the transducer winding the inductance of which varies with the axial position of the core. The widths of the coils and the number of turns in each coil varies so as to produce a substantially linear variation of inductance as the core is moved. A temperature responsive resistor is mounted in close proximity to the winding and is connected in a resistance network which includes the winding. The inductance of the winding is checked by applying a step voltage to the resistance network and monitoring the change of current in a part of the network.

7 Claims, 4 Drawing Figures

LINEAR INDUCTIVE TRANSDUCERS

This invention relates to a temperature compensated inductive transducer system including a transudcer having an axially movable core member, said core member in use, being movable by a component the movement of which is to be measured, the core member being slidable within a winding.

The object of the invention is to provide a transducer system of the kind specified in a form in which compensation is provided for variation in temperature.

According to the invention a temperature compensated inductive transducer system comprises a winding having a plurality of coils and a core member slidable within the winding to vary the inductance thereof, the dimensions of said coils and the number of turns thereof being arranged so that the inductance of the winding changes substantially linearly over the desired range of movement of the core member, circuit means for applying a step voltage across a resistance network including said winding, means for monitoring the change in current in a part of said resistance network as a result of the application of said step voltage, said means providing an output signal when the current flow reaches a predetermined value, and a temperature responsive resistor forming part of said resistance network, said temperature responsive resistor being mounted in close proximity to the winding.

An example of a transducer system in accordance with the invention will now be described with reference to the accompanying drawings, in which.

Figure 1:
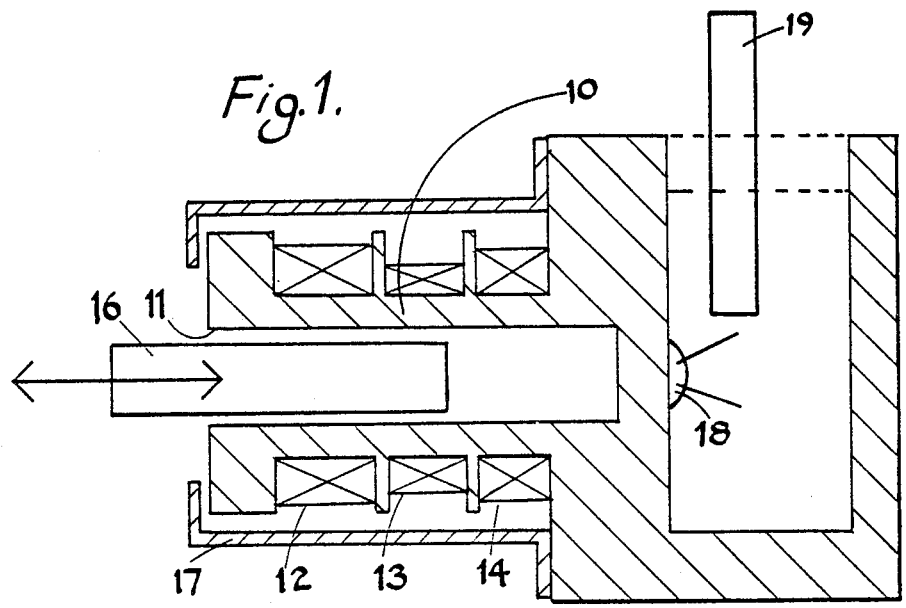
FIG. 1 is a sectional side elevation of a transducer forming part of the system.

The transducer system is intended to provide a signal which can be processed to provide an indication of the position of a piston forming part of a fuel injection pumping apparatus for supplying fuel to an internal combustion engine.

The transducer system includes a transducer having a former 10 which is constructed from a non-magnetic electrically insulating material such as plastics. In the former there is provided a blind bore 11 and in the peripheral surface of the former there is provided a plurality, in this case three, of circumferentially extending grooves 12, 13 and 14.

Slidable within the bore 11 is a core 16 formed from a material having a high permeability and a high internal resistance. An example of such a material is ferrite. The core member extends into the bore from the end adjacent the groove 12.

Surrounding the former 10 is a tubular member 17, which again is formed from high permeability, high resistivity material.

The former is integral with a mounting which also supports a thermistor, or a thermistor/resistor combination 18, which is used to compensate for temperature changes as will be explained.

The mounting also carries a number of terminal blades 19, by which means the transducer and thermistor are connected to an electronic decode circuit.

It will be observed that the dimensions of the grooves 12, 13 and 14 and the individual coils within them are different so that the output of the decode circuit can be arranged to vary in a substantially linear manner as the core 16 is moved within the former. The individual coils are connected in series to form the transistor winding.

In a particular example, the grooves 12, 13 and 14 are respectively 7 mm, 5 mm and 3 mm wide, with 0.75 mm walls, the grooves having an inner diameter of 5.7 mm and an outer diameter of 10.05 mm. The coils in the grooves have 695 turns, 100 turns and 275 turns and the deviation of the output from linearity is within ±1% of full scale output over a working movement of 11 mm and ±0.5% over a range of 10 mm. If a single coil of comparable length is used then th variation of the output exhibits similar linearity over only about 2 mm.

The dimensions of the grooves can be related to the working range of the transducer, thus the groove 14 has a width equal to 30% of the working range, the groove 13 a width equal to 50% of the working range, and the groove 12 a width equal to 70% of the working range. The inside diameters of the coils are equal to 57% of the working range and the outside equal to the working range. It is possible therefore to determine the coil dimensions when a different working range is required. The core extends into the open end of the bore, the starting position being with the inner end of the core 5 mm into the coil in the groove 12.

The construction is particularly suited for use with a compression ignition engine where it is subject to severe vibration and also contact with diesel fuel. The transducer system so far described is not however insensitive to variations in the working temperature so that the impedance of the winding will vary slightly with variation in temperature.

Figure 2:
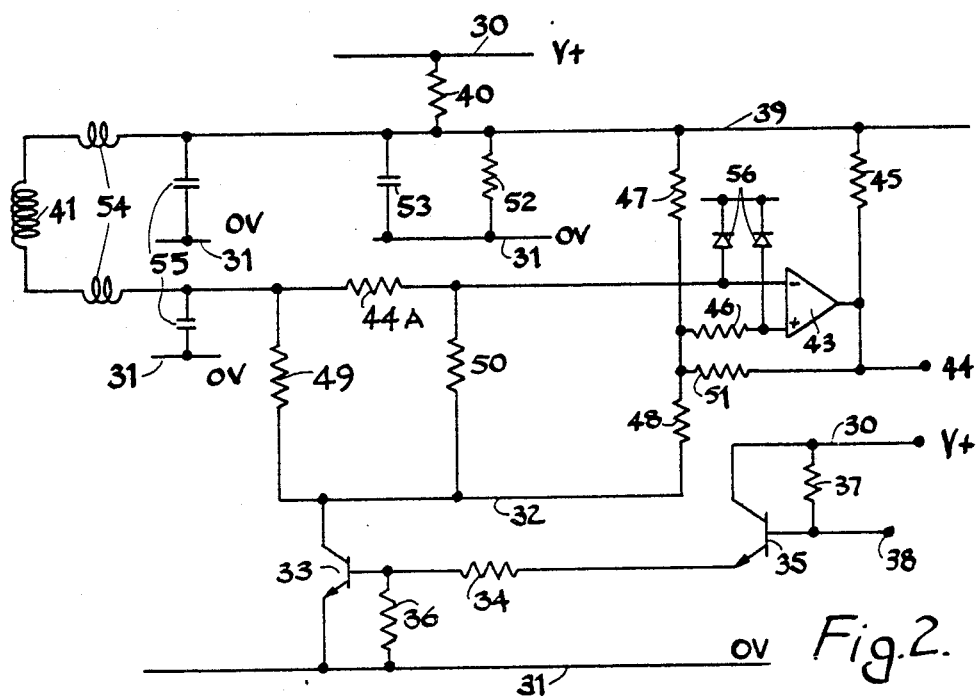
FIG. 2 is a circuit diagram of a measuring circuit for use with the transducer.

The impedance of the winding is measured by applying a voltage step across the series circuit of a resistor and the winding and measuring the time taken for the voltage across the resistor to rise to a specified value. FIG. 2 shows a circuit which makes use of this technique to provide a pulse output the duration of which corresponds to the aforesaid time.

With reference to FIG. 2 the circuit comprises a positive supply line 30 and a negative supply line 31 connected in use to a source of DC supply. Also provided is an intermediate supply line 32 which is connected to the line 31 by way of the collector emitter path of a transistor 33 having its base connected by way of a resistor 34 to the emitter of a further transistor 35 and by way of a resistor 34 to the emitter of a further transistor 36 to the line 31. The collector of transistor 35 is connected to the line 30 and also to its base by way of a resistor 37. The base is also connected to an input terminal 38.

An intermediate line 39 is connected to line 30 by way of a resistor 40 and is also connected to one end of the winding indicated at 41. The other end of the winding is connected to the input of a comparator 43 by way of a resistor 44A. The output of the comparator is connected to an output terminal 44 and to the line 39 by way of a resistor 45. The other input of the comparator is connected by way of a resistor 46 to the tapping of a potentiometer comprising a pair of resistors 47, 48 connected to the lines 39 and 32 respectively. The ends of resistor 44A are connected to line 32 by way of resistors 49 and 50 and the output of the comparator is connected to the tapping of the potentiometer by way of resistor 51. The line 39 is connected to the line 31 by way of resistor 52 having a capacitor 53 connected in parallel therewith.

The other end of the winding 41 is connected to the junction of resistors 44A and 49, ferrite beads 54 in the connections between the winding and the circuit together with capacitors 55 acting to decouple the circuit from noise picked up by the connecting leads.

In operation, when an input signal is applied to the input terminal 38 transistor 35 conducts and therefore so also does transistor 33. The line 32 is therefore effectively connected to the line 31 with the result that a step voltage substantially equal to the potential drop between the lines 39 and 31 is applied to the series combination of resistor 49 and winding 41. Moreover, by virtue of the voltages applied to the input of the comparator its output goes high. The rate of rise of current flowing in the winding depends upon its impedance and as the current increases the voltage drop across the resistor 49 also increases until the value is reached at which the output of the comparator goes low. The length of the output pulse which appears at the output terminal 44 is therefore an indication of the time required for the current to rise to the predetermined value and therefore an indication of the impedance of the winding. This in turn depends upon the position of the core 16.

The resistor 40 is provided for protection in the event, for example, that either of the leads connecting the winding to the remainder of the circuit should become earthed. Diodes 56 are connected between the inputs of the comparator 43 and an intermediate voltage supply line again for the purpose of protection. The resistor 51 is provided for the purpose of achieving a rapid switching action.

The impedance of the winding will also depend upon the temperature and in order to maintain the linearity of the transducer in spite of temperature variation, compensation must be applied. Two methods of temperature compensation will now be described. The first method is to employ a positive temperature co-efficient thermistor and this method will now be described with reference to FIG. 3. A positive co-efficient thermistor 18, in close thermal contact with the winding, is connected to the junction of the winding 41 and the resistor 49. The other end of the thermistor 18 is connected to the line 32 by way of a resistor 57. A ferrite bead 54 and a capacitor 55 are again included for high frequency decoupling.

As the temperature of the winding 41 changes, so also does its impedance and the thermistor alters the resistance of the network including the thermistor 18 and resistors 57 and 49 to compensate. The resistance values of components 18, 57, 49 are chosen to minimize the temperature effects on the output pulse width, over the temperature range of interest.

Figure 4:
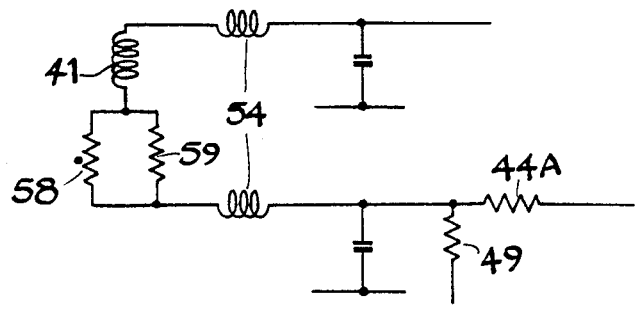

A second method is shown in FIG. 4 and in this case a negative temperature co-efficient thermistor 58 is connected between the winding 41 and the resistor 49 and another resistor 59 is connected in parallel with the thermistor 58. The value of components 58, 49, and 59 are again chosen to minimize the temperature effects on the output pulse width, over the range of temperature of interest.

Figure 3:
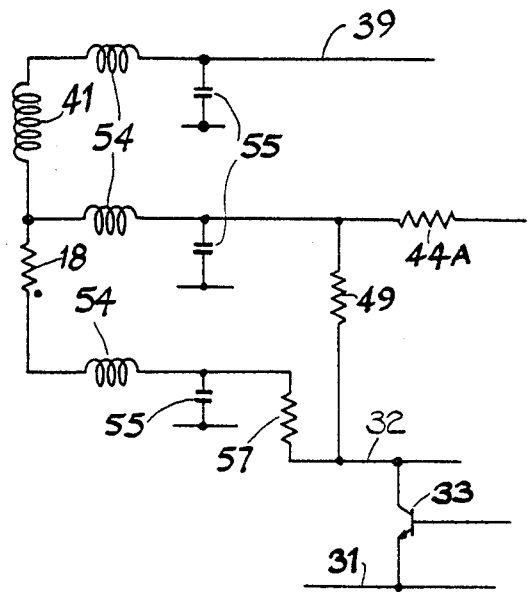
FIGS. 3 and 4 are circuit diagrams of temperature compensation circuits one or the other of which is incorporated into the circuit of FIG. 2.

The thermistor 18 in the circuit shown in FIG. 3 can be utilized to provide a signal representative of the temperature of the surroundings of the thermistor. In the case of a transducer system designed to monitor the position of the piston in a fuel pumping apparatus, it can be arranged that the transducer and in particular the thermistor is surrounded by fuel. The viscosity of the fuel can influence the operation of the apparatus as also can the density of the fuel. Both of these depend upon the temperature of the fuel. It is therefore useful to have a signal representative of the temperature.

In carrying out the temperature determination it is arranged that the transistor 33 remains conductive for a period which is longer than that required for the production of the output pulse from the comparator. This is to allow the current flow to rise to the value as determined by the resistance of the thermistor and resistor 57. The voltage at the junction of these two components can be measured and from this measurement the temperature of the thermistor and therefore the fuel can be determined.

We claim:

1. A temperature compensated inductive transducer system comprising a winding having a plurality of coils and a core member slidable within the winding to vary the inductance thereof, the dimensions of said coils and the number of turns thereof being arranged so that the inductance of the winding changes substantially linearly over the desired range of movement of the core member, circuit means for applying a step voltage across a resistance network including said winding, said circuit means including a transistor having its collector emitter path connected in circuit with a source of electric supply and said resistance network, further means for monitoring the change in current in a part of said resistance network as a result of the application of said step voltage and for providing an output signal when the current reaches a predetermined value, and a temperature responsive resistor forming part of said resistance network, said temperature responsive resistor being mounted in close proximity to the winding.

2. A temperature compensated inductive transducer system comprising a winding having a plurality of coils and a core member slidable within the winding to vary the inductance thereof, the dimensions of said coils and the number of turns thereof being arranged so that the inductance of the winding changes substantially linearly over the desired range of movement of the core member, circuit means for applying a step voltage across a resistance network including said winding, further means for monitoring the change in current in a part of said resistance network as a result of the application of said step voltage and for providing an output signal when the current reaches a predetermined value, a temperature responsive resistor forming part of said resistance network, said temperature responsive resistor being mounted in close proximity to the winding, said resistance network including a first resistor connected in series with said winding and said temperature responsive resistor comprises a positive temperature co-efficient thermistor connected in series with a second resistor, said thermistor and said second resistor being connected in parallel with said first resistor.

3. A system according to claim 2 in which said further means includes means responsive to the voltage drop across said first resistor.

4. A system according to claim 5 in which said further means inclds a comparator having inputs connected to the opposite ends of said first resistor.

5. A system according to claim 2 including means responsive to the voltage at the junction of said thermistor and said second resistor for providing a signal representing the temperature of the thermistor.

6. A system according to any one of the claims 1, 2, 3, 4 or 5, in which said winding has three coils which are connected in series to form said winding, said coils being disposed in side by side relationship.

7. A system according to claim 8 in which the core member passes through the first core, the first coil having an axial length substantially equal to 70% of the required linear range of core movement, the second coil having an axial length substantially equal to 50% of the required linear range of core movement and the third coil having a length substantially equal to 30% of the required linear range of core movement, the first coil having 65% of the total number of turns, the second coil 9.3% and the third coil 25.7% of the total number of turns.

* * * * *